United States Patent
Hyodo

[11] Patent Number: 6,018,589
[45] Date of Patent: Jan. 25, 2000

[54] IMAGE PROCESSING METHOD AND APPARATUS USING A TRUNCATED HISTOGRAM

[75] Inventor: Manabu Hyodo, Asaka, Japan

[73] Assignee: Fuji Photo Film Co., Ltd., Kanagawa, Japan

[21] Appl. No.: 08/437,379

[22] Filed: May 9, 1995

[30] Foreign Application Priority Data

May 9, 1994 [JP] Japan .................................. 6-095204
Nov. 9, 1994 [JP] Japan .................................. 6-274946

[51] Int. Cl.$^7$ ...................................................... G06K 9/00
[52] U.S. Cl. ......................... 382/168; 382/167; 382/274
[58] Field of Search .................................. 382/167, 169, 382/274, 168, 172; 358/461, 522

[56] References Cited

U.S. PATENT DOCUMENTS

| | | | |
|---|---|---|---|
| 4,342,047 | 7/1982 | Niemczyk et al. | 358/504 |
| 4,346,406 | 8/1982 | Kato et al. | 348/162 |
| 4,667,228 | 5/1987 | Kawamura et al. | 358/519 |
| 4,727,434 | 2/1988 | Kawamura | 358/522 |
| 4,761,739 | 8/1988 | Shimura | 364/413.23 |
| 4,891,692 | 1/1990 | Outa | 358/506 |
| 5,036,545 | 7/1991 | Iida et al. | 382/274 |
| 5,053,888 | 10/1991 | Nomura | 382/274 |
| 5,387,930 | 2/1995 | Toh | 348/222 |
| 5,436,733 | 7/1995 | Terada et al. | 358/448 |
| 5,461,490 | 10/1995 | Yonezawa | 358/445 |
| 5,524,070 | 6/1996 | Shin et al. | 382/272 |

FOREIGN PATENT DOCUMENTS

63-124665 5/1988 Japan .

Primary Examiner—Yon J. Couso

[57] ABSTRACT

The gradation data is found from image signals for one screen, which are obtained when an image is picked up, and a histogram is made by counting all the gradation data for one screen in every gradation, with a predetermined frequency as an upper limit. Then, a reference minimum value of the image signals is calculated by detecting a point where a cumulative frequency which is counted from a small gradation of the histogram reaches a predetermined rate for total number of the gradation data, and a reference maximum value of the image signals is calculated by detecting a point where a cumulative frequency which is counted from a large gradation of the histogram reaches a predetermined rate. The image processing is carried out in accordance with the calculated reference minimum value and reference maximum value.

30 Claims, 7 Drawing Sheets

IMAGE PROCESSING METHOD AND APPARATUS USING A TRUNCATED HISTOGRAM

BACKGROUND OF THE INVENTION

1. Field of the Invention

The present invention relates to an image processing method and more particularly to an image processing method used for an image reading apparatus which reads out an image of a negative film, a positive film, a reflection manuscript, and so forth.

2. Description of the Related Art

Conventionally, there is proposed a negative scanner which picks up an image on a negative film with a solid-state image sensing device such as a CCD, etc. and which image-processes image signals outputted from the CCD to display them on a monitor TV.

One example of the conventional image processing method for the negative film is represented by Japanese Patent Application Laid-Open No. 63-124665. This image processing method comprises the steps of making a histogram of all the gradation data of the image signals output from the CCD for respective R, G and B signals, finding a reference minimum value and a reference maximum value with a threshold level at $\frac{1}{16}$ which is the maximum frequency of the histogram, and image-processing according to the reference minimum value and the reference maximum value.

However, in the above-described image processing method, a histogram is made for all the gradation data of the image signals, therefore a maximum table value of the histogram needs to be set at the same as the total number of the gradation data obtained from one negative film (5000–10000 data in one negative film), considering the case when the total number of the gradation data are concentrated in some gradation range. As a result, there is a disadvantage in that the circuit size of a counter, etc. should be large in the conventional image processing method.

And, in the above-mentioned image processing method, the gradation characteristics of the image signals output from the CCD are not corrected, so there is a disadvantage in that the image of soft and hard gradation is displayed as it is when the gradation characteristic is the soft gradation (the gradation characteristic that the frequency range is wide) and the hard gradation (the gradation characteristic that the frequency range is narrow).

SUMMARY OF THE INVENTION

The present invention has been developed in view of the above-described circumstances and has as its aim the provision of an image processing method wherein a circuit, which calculates a reference minimum value and a reference maximum value of image signals, is small and the image is well regenerated with a uniform tone.

To achieve the above-described object, the image processing method according to the present invention comprises the steps of finding the gradation data from image signals of a picked-up image for one screen, finding a reference minimum value of the image signals by detecting a point where a cumulative frequency which is counted from a small gradation in the histogram reaches a predetermined rate which is set for the total number of the gradation data, finding a reference maximum value of the image signals by detecting a point where a cumulative frequency counted from a large gradation in the histogram reaches the predetermined rate, and image-processing in accordance with the calculated reference minimum value and reference maximum value.

The image processing method according to the present invention also includes the steps of finding the reference minimum value and reference maximum value of the image signals in accordance with the image signals of a picked-up image, calculating a luminance ratio by dividing the reference maximum value by the reference minimum value, and correcting at least one of the reference minimum value and the reference maximum value so as to make the calculated luminance ratio closer to a predetermined luminance ratio.

According to the present invention, when the reference maximum value and reference minimum value of the image signals, which are required for regenerating the color and tone in a good condition, are calculated, all the gradation data for one screen are found from the image signals of a picked-up image, and the histogram is made by counting the gradation data in each gradation. The histogram is made by counting the gradation data in each gradation up to a predetermined frequency which is defined as an upper limit (for example, 1% of the total number of the gradation data). As a result, when the histogram is made, a counter which has a small counter value can be used.

And, the reference minimum value of the image signals is the gradation in the case when the cumulative frequency which is counted from a small gradation in the histogram reaches the predetermined rate which is set for the total number of the gradation data, and similarly, the reference maximum value is the gradation in the case when the cumulative frequency counted from a large gradation of the histogram reaches a predetermined rate for the total number of the gradation data. According to the other embodiments of the present invention, when the reference maximum value and the reference minimum value of the image signals, which are required for regenerating the color and the tone in a good condition, are determined, the luminance ratio is calculated by dividing the reference maximum value by the reference minimum value, and at lease one of the reference minimum value and the reference maximum value is corrected so as to make the calculated luminance ratio closer to the predetermined luminance ratio, so that the tone of the image can be uniform. That is, when the gradation characteristic of the image is the soft gradation, the value is corrected to be closer to the hard gradation, and when the gradation characteristic of the image is the hard gradation, the value is corrected to be closer to the soft gradation.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein:

FIGS. 2(A), 2(B), 2(C), 2(D), 2(E), and 2(F) are explanatory views explaining the gradation of output signals in each part in FIG. 1;

DESCRIPTION OF THE PREFERRED EMBODIMENT

Detailed description will hereunder be given of the preferred embodiment of an image processing method according to the present invention with reference to the accompanying drawings.

Figure 1:
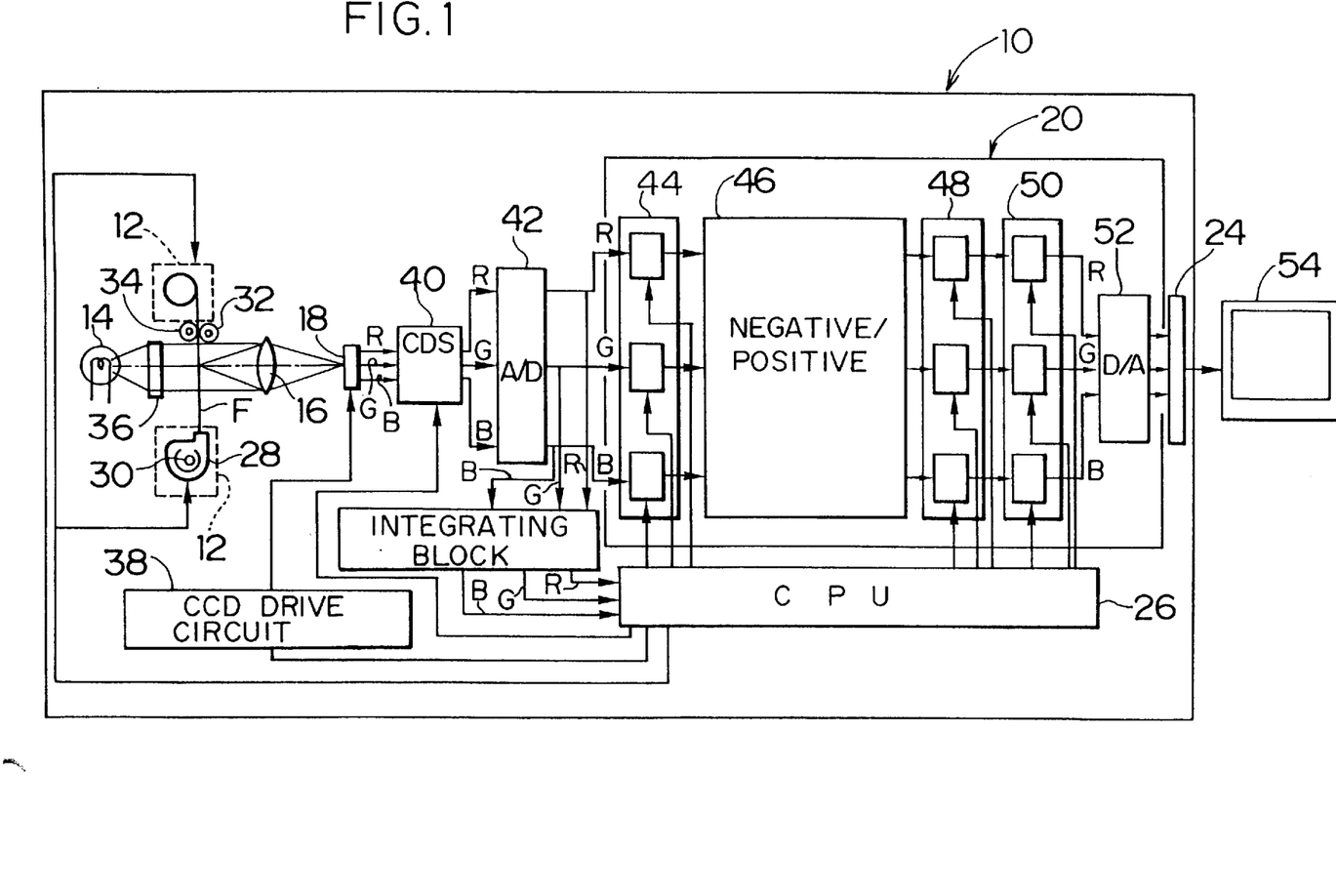
FIG. 1 is a block diagram showing an embodiment of a negative scanner wherein an image processing method of the present invention is used.

FIG. 1 is a block diagram illustrating an embodiment of the negative scanner wherein the image processing method according to the present invention is used. The negative scanner comprises a film drive unit 12 which conveys a photographic film F into a body 10, a light source 14 for illumination, a taking lens 16, a CCD line sensor 18, a signal processing circuit 20, an integrating block 22, an encoder 23, a central processing unit (CPU) 26 and the like.

The film drive unit 12 connected with a spool axis 30 of a film cartridge 28 comprises a film supplying part which
drives it forward/backward, a film winding part which winds the photographic film F sent from the film supplying part, a conveying means which conveys the photographic film F between a capstan 32 and a pinch roller 34 which are driven by a motor at a desired speed. The film supplying part drives the spool axis 30 of the film cartridge 28 counterclockwise as shown in the drawing, and sends out the photographic film F from the film cartridge 28 until the forward end of the film is wound by the film winding part.

The light source 14 illuminates the developed film F pulled out from the film cartridge 28 via an infrared cutting filter 36, and the light, which has transmitted through the film F, is formed on a light acceptance surface of the CCD line sensor 18 through the taking lens 16.

In the CCD line sensor 18, many photoelectric elements are provided in the direction perpendicular to the film conveying direction, and the image light formed on the light acceptance surface of the CCD line sensor 18 is charged in each photoelectric element which is provided with R, G, and B filters, and is converted into R, G and B signal charge which carries a quantity of electricity corresponding to the light strength. The R, G and B electric charge accumulated in the above-mentioned way is added with a lead gate pulse of one line period by a CCD drive circuit 38, is transferred to a shift register, and then is consecutively output as a voltage signal by a register transfer pulse. The output R, G and B voltage signals are added to an analog amplifier, which is not shown in the drawing, being held by a CDS cramp 40, and a gain is controlled by the analog amplifier.

The R, G and B voltage signals output from the analog amplifier are converted into R, G and B digital signals by an A/D converter 42, and then output to the signal processing circuit 20.

Figure 2A:
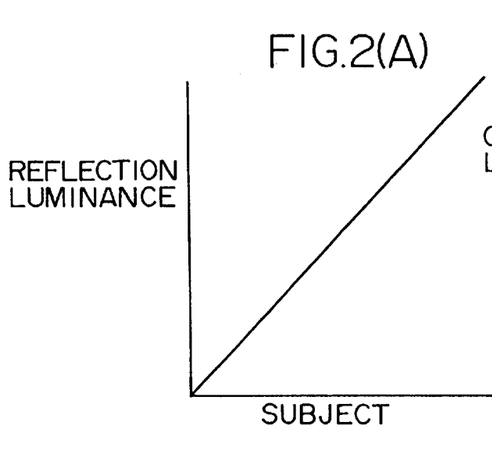
Figure 2B:
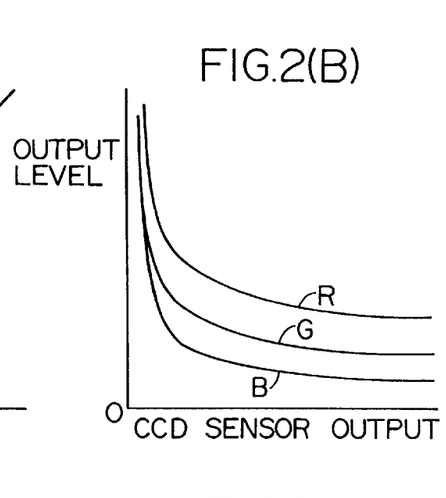

Now, when the CCD line sensor 18 picks up the negative film, on which the subject having the gradation linearly increasing, as shown in FIG. 2(A), the R, G and B output signals output from the CCD line sensor 18 show such a waveform as shown in FIG. 2(B) because of the characteristics of the negative film's gamma.

The signal processing circuit 20 carries out the signal processing for the input R, G and B signals such as equalization of a black level's peak and negative-positive inversion, equalization of a white level's peak, and a gamma correction. First, it equalizes peak values (a black level of a positive image ) of R, G and B signals by respectively adding appropriate offset values of R, G and B signals to the input R, G and B signals in an adding circuit 44 shown in FIG. 1 (refer to FIG. 2(C)). How to calculate the offset values will be described later.

Figure 2C:
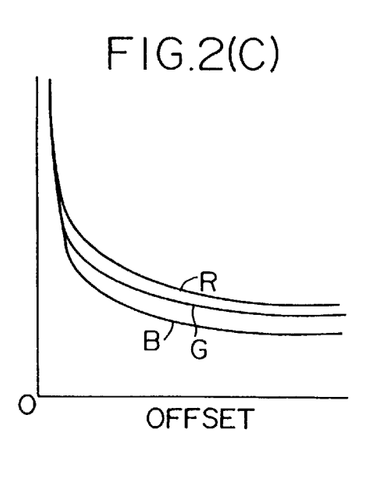
Figure 2D:
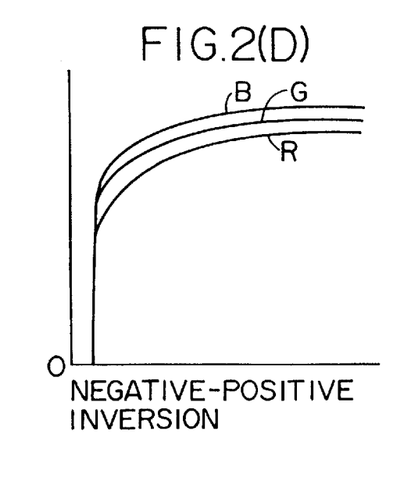

Next, a negative-positive inversion circuit 46 carries out the negative-positive inversion by subtracting the offset R, G and B signals from a predetermined peak value. FIG. 2(D) shows the R, G and B signals which have been negative-positive inverted.

Next, a multiplying circuit 48 respectively multiplies the negative-positive inverted R, G and B signals by the suitable gain to perform the white balance correction. That is, as shown in FIG. 2(E), the other peak values (a white level of a positive image) of the R, G and B signals are equalized. How to calculate the gain will be described later.

A gamma correction circuit 50 respectively gamma-corrects the white-balanced R, G and B signals, so that the medium gradation of the R, G and B signals are equalized and the R, G and B signals are provided with a predetermined gamma ($\gamma=0.45$)(refer to FIG. 2(F)). The R, G and B digital signals output from the gamma correction circuit 50 are converted into R, G and B analog signals within the A/D converter 52, then output to the encoder 24. In the encoder 24, the R, G and B signals are converted into video signals of NTSC system and output to a monitor TV 54.

On the other hand, the A/D converter 42 outputs the R, G and B digital signals for one frame of the photographic film F to the integrating block 22. The block 22 integrates the R, G and B digital signals of the predetermined number of picture elements for respective signals in one screen and calculates the average value of them, and makes the gradation data of 5000–10000 points per one screen. And, the block 22 counts a frequency of every gradation (which is a gradation of 8 bit (255) in this embodiment), and stops counting when the frequency reaches a threshold level (TH: 1% in this embodiment) which is set for the total number of the gradation data. That is, the integrating block 22 of this embodiment does not count the gradation data more than the threshold level. In this way, the integrating block 22 makes a simplified histogram 60 shown with a diagonal line in FIG. 3 in which the gradation data are counted up to the threshold level among all the gradation data 0–255, and outputs it to the CPU 26. And, the CPU 26 finds the gradation in the case when a cumulative frequency counted from a small gradation in the histogram 60 reaches the predetermined value (1% in this embodiment) for the total number of gradation data as a reference minimum value, and similarly, find the gradation in the case when a cumulative frequency counted from a large gradation in the histogram 60 reaches the predetermined value (1% in this embodiment) for the total number of gradation data as a reference maximum value.

The CPU 26 calculates offset values for the respective R, G and B signals in accordance with the reference maximum value, and outputs the offset values to the adding circuit 44. And, the CPU 26 calculates the gain amount of the respective R, G and B signals in accordance with the reference maximum value and reference minimum value, and outputs the gain amount to the multiplying circuit 48. Incidentally, a histogram 61 shown with a two-dot chain in FIG. 3 means a histogram in the case when all the gradation data are counted.

Next, it will be explained how to calculate the offset value with the adding circuit 44 and how to calculate the gain with the multiplying circuit 48.

The offset values $R_{offset}$, $G_{offset}$, and $B_{offset}$ of the R, G and B signals can be calculated with the following equations:

$$R_{offset}=255-R_{ref\,max}$$

$$G_{offset}=255-G_{ref\,max}$$

$$B_{offset}=255-B_{ref\,max};$$

where the reference maximum values for the R, G and B signals are $R_{ref\,max}$, $G_{ref\,max}$ and $B_{ref\,max}$ respectively.

And, the offset values $R_{offset}$, $G_{offset}$, and $B_{offset}$ calculated with the above-mentioned equations are added to the input R, G and B signals in the adding circuit 44. As a result, the peak values (the black level of the positive image) of the R, C and B signals can be equalized by the adding circuit 44 as shown in FIG. 2(C).

The gain $R_{gain}$, $G_{gain}$ and $B_{gain}$ can be calculated with the following equations:

$$R_{gain}=255/(R_{ref\,max}-R_{ref\,min})$$

$$G_{gain}=255/(G_{ref\,max}-G_{ref\,min})$$

$$B_{gain}=255/(B_{ref\,max}-B_{ref\,min});$$

where the reference minimum values for the R, G and B signals are $R_{ref\,min}$, $G_{ref\,min}$ and $B_{ref\,min}$ respectively.

The offset R, G and B signals are respectively multiplied by gain $R_{gain}$, $G_{gain}$ and $B_{gain}$ calculated with the above-mentioned equations in the adding circuit 48. As a result, the peak values (the white level of the positive image) of the R, G and B signals can be equalized as shown in FIG. 2(E).

Figure 3:
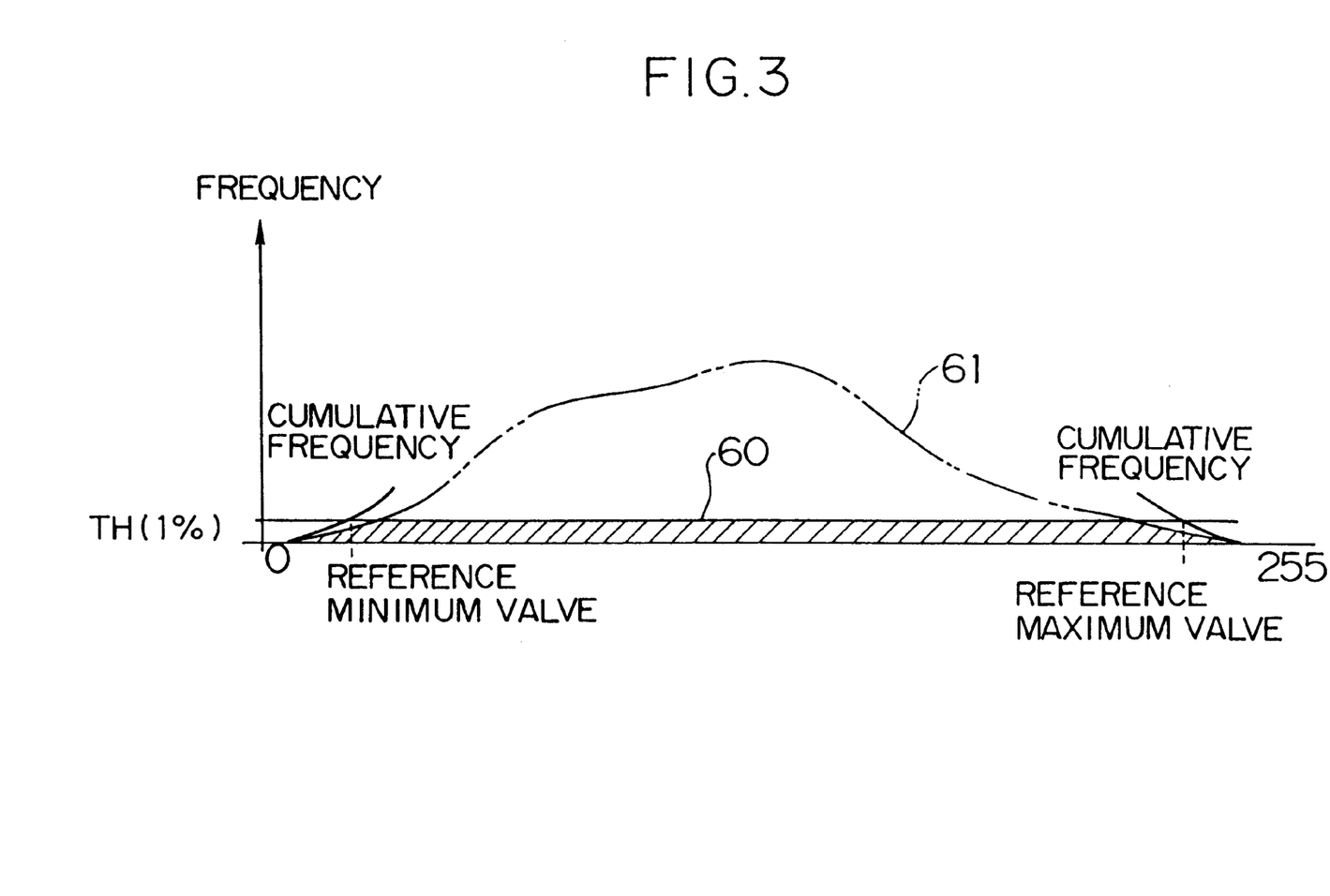
FIG. 3 is a histogram for each gradation of image signals.

As above described, in this embodiment, the reference minimum values and the reference maximum values for calculating the offset value and the gain for the respective R, G and B signals are respectively calculated with the simplified histogram 60 shown in FIG. 3. As a result, the reference minimum valve and the reference maximum value of the image signals can be calculated within a circuit having a smaller capacity than the circuit in the conventional image processing method which makes the histogram by counting all the gradation data of image signals.

Figure 4A:
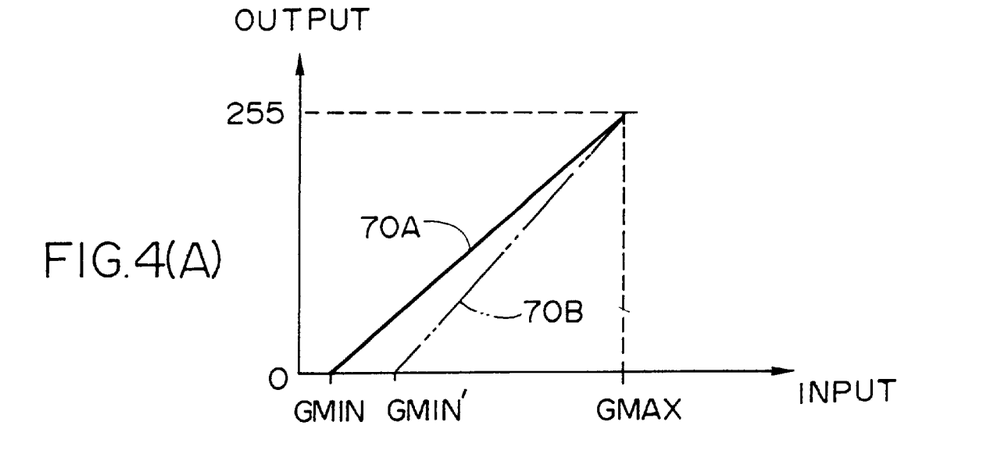
FIGS. 4(A) and 4(B) are explanatory views of the image signals of which minimum value has been respectively corrected.
Figure 4B:
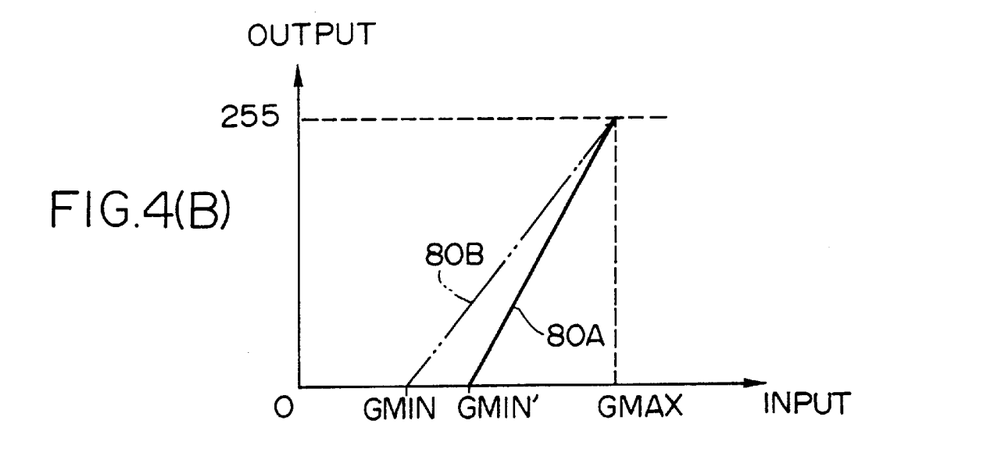

In the case when a gradient of the line which links the output of the calculated reference minimum value and that of the calculated reference maximum value is gentle as shown with a line 70A in FIG. 4(A), the image gradation is soft, and in the case when a gradient of the line is steep as shown with a line 80A in FIG. 4(B), the image gradation is hard.

Therefore, when the image gradation is soft, the image is corrected to be harder, and when the image gradation is hard, the image is corrected to be softer. That is, in the case of G signal, the CPU detects a reference minimum value $G_{ref\,min}$ and a reference maximum value $G_{ref\,max}$ from the histogram 60 of FIG. 3, and calculates a luminance ratio X by dividing the reference maximum value $G_{ref\,max}$ by the reference minimum value $G_{ref\,min}$. Then, the CPU 26 corrects the luminance ratio X to be a reference luminance ratio Y, which is a criterion for predetermined soft and hard gradation. For example, when the reference minimum value $G_{ref\,min}$ is corrected in a state that the reference maximum value $G_{ref\,max}$ ratio is constant so that the luminance ratio X can be corrected to be the reference luminance ratio Y:

$$Y=G_{ref\,max}/G_{ref\,min}':G_{ref\,min}'=\text{correction reference minimum value}$$

Therefore, $G_{ref\,min}'$ can be calculated with a following equation:

$$G_{ref\,min}'=G_{ref\,max}/Y$$

As a result, in this embodiment, the soft gradation characteristic can be corrected to be the hard gradation, and the hard gradation characteristic can be corrected to be the soft gradation.

Figure 5:
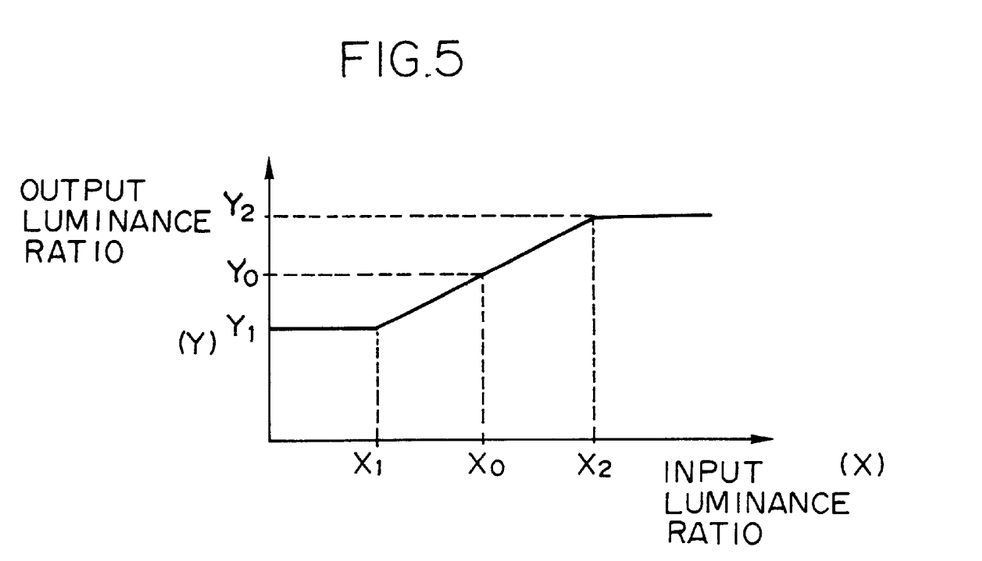
FIG. 5 is an explanatory view showing the relation between an input luminance ratio and an output luminance ratio.

And, the reference luminance ratio Y can be also calculated from a graph of FIG. 5. The horizontal axis of the graph in FIG. 5 indicates the input luminance ratio X, that is, the luminance ratio which has been obtained by dividing the calculated reference maximum value by the calculated reference minimum value, and the vertical axis indicates the output luminance ratio, that is, the reference luminance ratio Y for correcting the reference minimum value $G_{ref\,min}$.

As shown in FIG. 5, in the case that the input luminance ratio X indicates the value between the predetermined lower limit value $X_1$ and the predetermined upper limit value $X_2$, the output luminance ratio Y is corrected to be closer to the central value $Y_0$, and in the case that the input luminance ratio X is less than the lower limit value $X_1$, the reference minimum value $G_{ref\,min}$ is corrected to be the lower limit value $Y_1$ of the reference luminance ratio Y. And, in the case that the input luminance ratio X is more than the upper limit value $X_2$, the reference minimum value $G_{ref\,min}$ is corrected to be the upper limit value $X_2$ of the reference luminance ratio Y.

As a result, in this embodiment, the gradient of a line indicating the soft gradation as shown with a line 70A in FIG. 4(A) (A) can be steeper by a predetermined value, so that the image gradation can be corrected to be softer when displayed. And, the gradient of a line indicating the hard gradation as shown with a line 80A in FIG. 4(B) can be more gentle by a predetermined value, so that the image gradation can be corrected to be softer when displayed.

On the other hand, when $R_{min}$ and $B_{min}$ are corrected, they are calculated with following equations so that the white balance can be kept in a normal condition:

$$R_{gain}'=(G_{gain}'/G_{gain})\times R_{gain}$$

$$B_{gain}'=(G_{gain}'/G_{gain})\times B_{gain}$$

As a result, $R_{min}$ and $B_{min}$ can be corrected in the following way:

$$R_{min}'=R_{max}-((G_{max}-G_{min}')/(G_{max}-G_{min}))\times(R_{max}-R_{min})$$

$$B_{min}'=B_{max}-((G_{max}-G_{min}')/(G_{max}-G_{min}))\times(B_{max}-B_{min})$$

In this embodiment, the explanation was given of the embodiment wherein the reference minimum value is corrected, but the reference maximum value can be corrected instead. And, both of the reference maximum value and the reference minimum value can be corrected as explained below.

Figure 6:
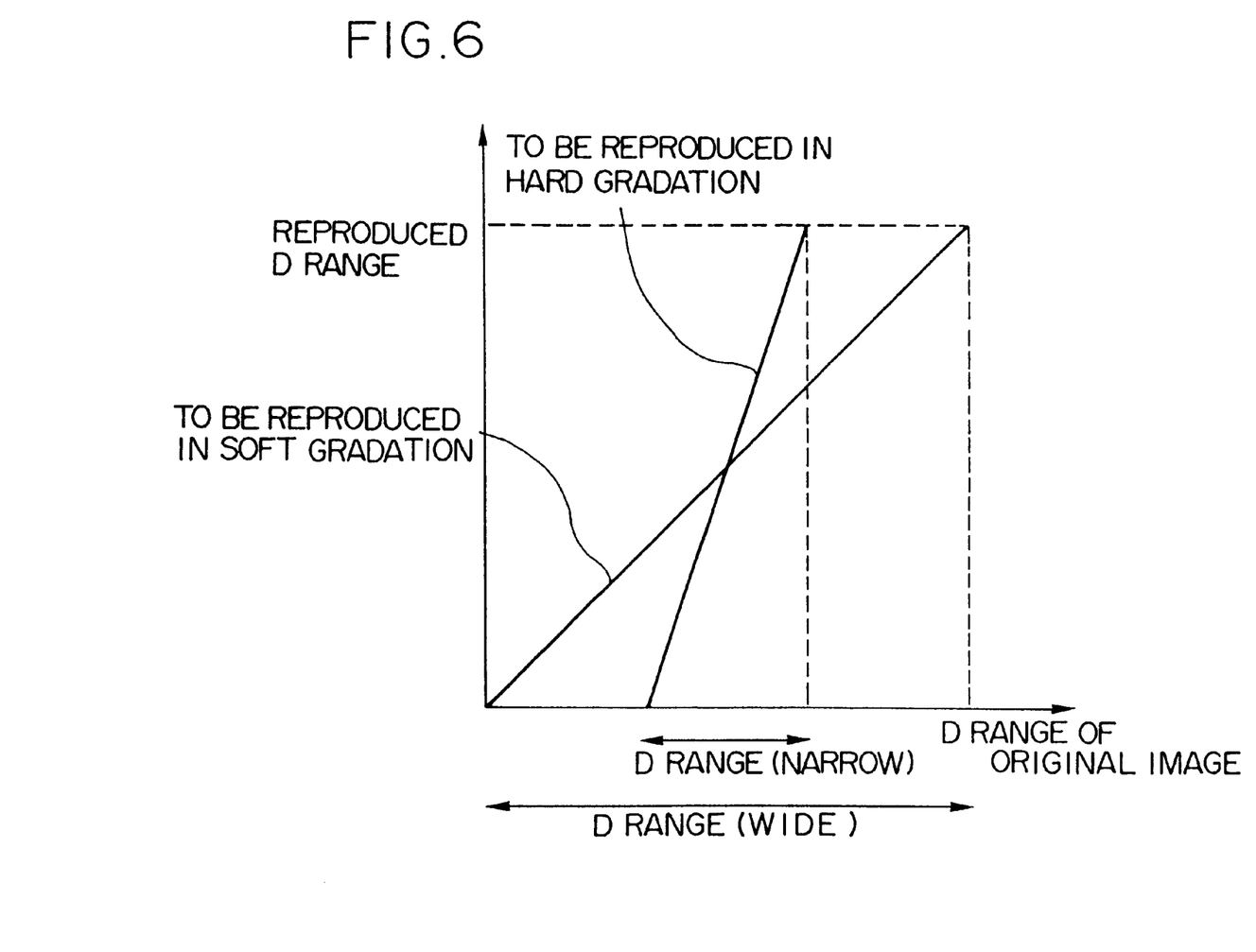
FIG. 6 is an explanatory view showing the relation between a dynamic range of an original image and a regenerated dynamic range; and, FIG. 7 is an explanatory view showing the characteristic carve of a film.

As shown in FIG. 6, the image gradation varied according to the dynamic range of the original image, and the gradation is soft when the dynamic range is large, and the gradation is hard when the dynamic range is small.

To solve this problem, the input dynamic range (the luminance ratio; because the antilogarithm range is corrected) is corrected so that the output gradation can be improved. In this case, because the luminance ration is uniform in the antilogarithm range, the correction is carried out in the following way, so as to make the density range of the original image more uniform in appearance.

When the current maximum value and minimum value are $T_1$ and $T_2$ respectively, the current luminance ratio is $R_1$ and the corrected luminance ratio $R_2$, the corrected maximum value $T_{top}$ and minimum value $T_{down}$ can be calculated with the following equations:

$T_{top}=(R_2/R_1)^{1/2} \times T_1$ $T_{down}=(R_1/R_2)^{1/2} \times T_2$

These equation can be calculated in the following way:

The current luminance ratio $R_1=T_1/T_2$     (1)

The current luminance ratio $R_2=T_{top}/T_{down}$     (2)

When the correction amount of the luminance ratio for the maximum value is $r_1$ and the correction amount for the minimum value is $r_2$, $r_1$ and $r_2$ can be calculated with following equations:

$r_1=T_{top}/T_1$     (3)

$r_2=T_2/T_{down}$     (4)

When the equations (3) and (4) are substituted for the equations (1) and (2), $R_2=R_1 \times r_2 \times r_2$     (5)

Figure 7:
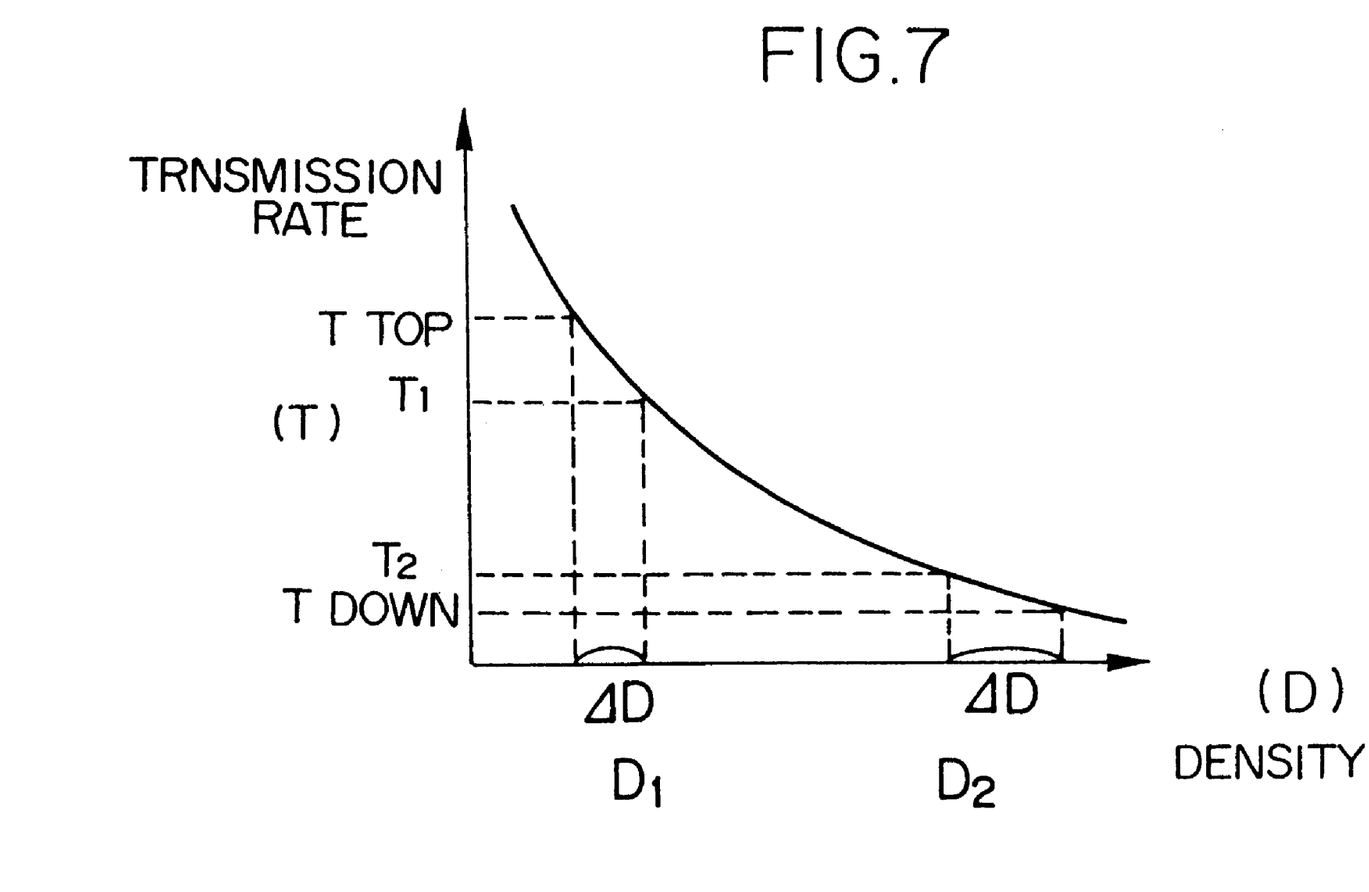

On the other hand, since the characteristic carve of the film is represented by $t=10^{-D}$ (refer to FIG. 7), $r_1=r_2$ when the correction amount ($\Delta D$) for the maximum value and minimum value is equalized, so the following equations are calculated from the equation (5):

$R_2=R_1 \times r_1^2$ $R_2=R_1 \times r_2^2$

As a result, $r_1=(R_2/R_1)^{1/2}=r_2$     (6)

When the equation (6) is substituted for the equations (3) and (4), $T_{top}/T_1=(R_2/R_1)^{1/2}$, therefore, $T_{top}=(R_2/R_1)^{1/2} \times T_1$ $T_2/T_{down}=(R_1/R_2)^{1/2}$, therefore, $T_{down}=(R_1/R_2)^{1/2} \times T_2$ According to this method, the image can be processed without changing the density, and the dynamic range of the original image is corrected to equalize the gray balance, so that the reproduced image can have an excellent and uniform gradation.

In this embodiment, the threshold level in the histogram 60 is set at 1%, but the present invention is not limited to this. In the case when the gradation characteristic is that the frequency rapidly increases in the lower and higher gradations, the threshold level can be set at more than 2%. And, in this embodiment, the luminance ratio is corrected in accordance with the simplified histogram 60 (FIG. 3), but the luminance ratio can be also corrected in accordance with the histogram 61 (FIG. 3) which is obtained by counting all the gradation data. Moreover, in this embodiment, the histogram 60 is made of the average of the gradation data calculated in the integrating block 22, but it can be also made from the R, G and B digital signals stored in all of the picture elements.

And, in this embodiment, the explanation was given of the image processing method used for the color negative film, but it can be also used for the black and white negative film. And, in this embodiment, the image processing is carried out by correcting the black and white level in accordance with the reference minimum value and the reference maximum value which have been obtained from the simplified histogram 60 (FIG. 3), but the present invention is not limited to this. The image processing can be also carried out by controlling an electric shutter speed of the CCD line sensor or the light amount of the light source 14 in accordance with the reference minimum value and the reference maximum value.

As has been described above, according to the image processing method of the present invention, the histogram of the gradation data, which is necessary for calculating the reference minimum value and reference maximum value of the image signals, is made by counting the gradation data in each gradation up to a predetermined frequency which is defined as an upper limit, so a counter having a small counter value can be used and the circuit structure can be simplified. And, when the reference maximum value and the reference minimum value are determined, the luminance ratio is calculated by dividing the reference maximum value by the reference minimum value, and at least one of the reference minimum value and the reference maximum value is corrected so that the calculated luminance ratio can be closer to the predetermined reference luminance ratio. As a result, when the image gradation is soft, the value can be corrected to be closer to the hard gradation, and when the image gradation is hard, the value can be corrected to be closer to the soft gradation, so that the image gradation can be uniform.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing method for processing a frame, comprising the steps of:

finding all of gradation data for the frame from image signals of a picked-up image;

making a truncated histogram by counting the gradation data in each gradation up to a predetermined frequency which is defined as an upper limit and ceasing said counting when said upper limit has been reached;

calculating a reference minimum value of said image signal by detecting a point where a cumulative frequency counted from a smallest gradation for the reference minimum value in said truncated histogram reaches a predetermined rate set for total number of said gradation data;

calculating a reference maximum value of said image signal by detecting a point where a cumulative frequency counted from a largest gradation in the reference maximum value in said histogram reaches said predetermined rate; and image-processing according to the calculated reference minimum value and reference maximum value of the image signal.

2. The image processing method according to claim 1, wherein said gradation data is a value which is obtained by dividing the frame into plural areas and averaging the image signals of picture elements in each area.

3. The image processing method according to claim 1, wherein said predetermined frequency for making said histogram equals the cumulative frequency of said predetermined rate.

4. The image processing method according to claim 1, wherein said predetermined rate for total number of said gradation data is 1%.

5. An image processing method comprising the steps of:
calculating a reference minimum value and a reference maximum value of an image signal based on the image signal of a picked-up image;
dividing said reference maximum value by said reference minimum value to calculate a luminance ratio; and
correcting at least one of said reference minimum value and maximum value, thereby making said calculated luminance ratio closer to a predetermined reference luminance ratio.

6. The image processing method according to claim 5, comprising the steps of:
finding all of gradation data for the frame from image signals of the picked-up image;
making a truncated histogram by counting the gradation data in each gradation up to a predetermined frequency which is defined as an upper limit and ceasing said counting which said upper limit has been reached; and
finding a reference minimum value and a reference maximum value of said image signals from said truncated histogram.

7. The image processing method according to claim 5, wherein the step of correcting includes correcting said reference minimum value and reference maximum value respectively by a same value so as to make said calculated luminance ratio closer to said predetermined reference luminance ratio.

8. The image processing method according to claim 5, comprising the steps of:
correcting a hard gradation to be softer by correcting the minimum value or the maximum value of said image signals to be a predetermined lower limit value of said reference luminance ratio when said luminance ratio is less than a predetermined lower limit value; and,
correcting a soft gradation to be harder by correcting the minimum value or the maximum value of said image signals to be a predetermined upper limit value of said reference luminance ratio when said luminance ratio is more than a predetermined upper limit value.

9. An image processing method which comprises the steps of calculating offset values and gain of R, G and B signals of a picked-up image from a reference minimum value and a reference maximum value for respective R, G and B signals, adding the offset values to said R, G and B signals, and multiplying the offset R, G and B signals by said gain so as to equalize a black level and a white level, comprising the steps of:
finding all gradation data for a frame for said respective R, G and B signals;
making a histogram for said respective R, G and B signals by counting the gradation data in each gradation up to a predetermined frequency which is defined as an upper limit and ceasing said counting when said upper limit has been reached;
calculating a reference minimum value for said respective R, G and B signals by detecting a point where a cumulative frequency which is cumulated from a smallest gradation for the reference minimum value in respective histograms for said R, G and B signals reaches a predetermined rate for total number of said gradation data; and
calculating a reference maximum value for said R, G and B signals by detecting a point where a cumulative frequency which is cumulated from a largest gradation for the reference maximum value of respective histograms for said R, G and B signals reaches said predetermined rate.

10. The image processing method according to claim 9, wherein offset values $R_{offset}$, $G_{offset}$, and $B_{offset}$ of said R, G and B signals are calculated with the following equations when the reference maximum value for the R, G and B signals are $R_{ref\,max}$, $G_{ref\,max}$ and $B_{ref\,max}$, respectively, and a target maximum value is A:

$R_{offset} = A - R_{ref\,max}$ $G_{offset} = A - G_{ref\,max}$ $B_{offset} = A - B_{ref\,max}$.

11. The image processing method according to claim 9, wherein gain $R_{gain}$, $G_{gain}$ and $B_{gain}$ are calculated with following equations when reference minimum values for the R, G and B signals are $R_{ref\,min}$, $G_{ref\,min}$ and $B_{ref\,min}$, respectively, the reference maximum values for the R, G and B signals are $R_{ref\,max}$, $G_{ref\,max}$ and $B_{ref\,max}$, respectively, and a target difference is A:

$R_{gain} = A/(R_{ref\,max} - R_{ref\,min})$ $G_{gain} = A/(G_{ref\,max} - G_{ref\,min})$ $B_{gain} = A/(B_{ref\,max} - B_{ref\,min})$.

12. An image processing apparatus for processing a frame, comprising:
means for finding all of gradation data for the frame from image signals of a picked-up image;
means for counting the gradation data in each gradation up to a predetermined frequency which is defined as an upper limit and for ceasing said counting when said upper limit has been reached;
means for generating a truncated histogram from counted gradation data;
means for calculating a reference minimum value of said image signal by detecting a point where a cumulative frequency counted from a smallest gradation for the reference minimum value in said truncated histogram reaches a predetermined rate set for total number of said gradation data;
means for calculating a reference maximum value of said image signal by detecting a point where a cumulative frequency counted from a largest gradation for the reference maximum value in said histogram reaches said predetermined rate; and
an image processor processing the image signal according to the calculated reference minimum value and reference maximum value of the image signal.

13. The image processing apparatus according to claim 12, wherein said means for finding includes means for dividing the frame into plural areas and for averaging the image signals of picture elements in each area.

14. An image processing apparatus comprising:
means for calculating a reference minimum value and a reference maximum value of an image signal based on the image signal of a picked-up image;
means for dividing said reference maximum value by said reference minimum value to calculate a luminance ratio; and
means for correcting at least one of said reference minimum value and maximum value, thereby making said calculated luminance ratio closer to a predetermined reference luminance ratio.

15. The image processing apparatus according to claim 14, further comprising:
   means for finding all of gradation data for one frame from image signals of the picked-up image;
   means for counting the gradation data in each gradation up to a predetermined frequency which is defined as an upper limit and ceasing said counting which said upper limit has been reached;
   means for generating a truncated histogram from counted gradation data; and
   means for finding a reference minimum value and a reference maximum value of said image signals from the truncated histogram.

16. The image processing apparatus according to claim 14, wherein said means for correcting includes means for correcting said reference minimum value and reference maximum value respectively by a same value so as to make said calculated luminance ratio closer to said predetermined reference luminance ratio.

17. The image processing apparatus according to claim 14, further comprising:
   means for correcting a hard gradation to be softer by correcting the minimum value of said image signals to be a predetermined lower limit value of said reference luminance ration when said luminance ration is less than a predetermined lower limit value; and
   means for correcting a soft gradation to be harder by correcting the minimum value or the maximum value of said image signals to be a predetermined upper limit value of said reference luminance ratio when said luminance ratio is more than a predetermined upper limit value.

18. An image processing apparatus for processing a frame comprising:
   means for calculating offset values and gain of R, G and B signals of a picked-up image of the frame from a reference minimum value and a reference maximum value for respective R, G and B signals;
   means for adding the offset values to said R, G and B signals, and for multiplying the offset R, G and B signals by said gain so as to equalize a black level and a white level;
   means for finding all gradation data for the frame for said respective R, G and B signals;
   means for counting the gradation data in each gradation up to a predetermined frequency which is defined as an upper limit and ceasing said counting when said upper limit has been reached;
   means for generating a histogram for said respective R, G and B signals from counted gradation data;
   means for calculating a reference minimum value for said respective R, G and B signals by detecting a point where a cumulative frequency which is cumulated from a smallest gradation for the reference minimum value in respective histograms for said R, G and B signals reaches a predetermined rate for total number of said gradation data; and
   means for calculating a reference maximum value for said R, G and B signals by detecting a point where a cumulative frequency which is cumulated from a largest gradation for the reference maximum value of respective histograms for said R, G and B signals reaches said predetermined rate.

19. The image processing apparatus according to claim 18, further comprising means for calculating offset values $R_{offset}$, $G_{offset}$ and $B_{offset}$ with following equations when reference maximum values for the R, G, and B signs are $R_{ref\ max}$, $G_{ref\ max}$ and $B_{ref\ max}$, respectively, and a target difference is A:

$$R_{offset} = A - R_{ref\ max}$$

$$G_{offset} = A - G_{ref\ max}$$

$$B_{offset} = A - B_{ref\ max}.$$

20. The image processing apparatus according to claim 18, further comprising means for calculating gain $R_{gain}$, $G_{gain}$ and $B_{gain}$ with following equations when reference minimum values for the R, G and B signals are $R_{ref\ min}$, $G_{ref\ min}$ and $B_{ref\ min}$, respectively, the reference maximum values for the R, G and B signals are $R_{ref\ max}$, $G_{ref\ max}$ and $B_{ref\ max}$, respectively, and a target difference is A:

$$R_{gain} = A/(R_{ref\ max} - R_{ref\ min})$$

$$G_{gain} = A/(G_{ref\ max} - G_{ref\ min})$$

$$B_{gain} = A/(B_{ref\ max} - B_{ref\ min}).$$

21. The image processing method according to claim 5, wherein a corrected reference maximum value $T_{top}$ and a corrected reference minimum value $T_{down}$ are calculated with following equations when said calculated luminance ratio is $R_1$, said reference luminance ratio is $R_2$, said reference maximum value is $T_1$, and said predetermined reference minimum value is $T_2$:

$$T_{top} = (R_2/R_1)^{1/2} \times T_1$$

$$T_{down} = (R_1/R_2)^{1/2} \times T_2.$$

22. The image processing method according to claim 14, wherein said means for correcting calculates a corrected reference maximum value $T_{top}$ and a corrected reference minimum value $T_{down}$ with following equations when said calculated luminance ratio is $R_1$, said reference luminance ratio is $R_2$, said predetermined reference maximum value $T_1$, and said reference minimum value is $T_2$:

$$T_{top} = (R_2/R_1)^{1/2} \times T_1$$

$$T_{down} = (R_1/R_2)^{1/2} \times T_2.$$

23. The image processing method according to claim 5, wherein
   said calculated luminance ratio represents a dynamic gradation range of the picked-up image,
   said predetermined reference luminance ratio represents a desired dynamic gradation range, and
   said correcting step equalizes gray balance of the picked-up image by adjusting said dynamic gradation range of the picked-up image toward said desired dynamic gradation range.

24. The image processing method according to claim 5, wherein
   said reference minimum value is corrected by dividing said reference maximum value by said predetermined reference luminance ratio, and
   said reference maximum value is corrected by multiplying said reference minimum value by said predetermined reference luminance ratio.

25. The image processing method according to claim 5, wherein said correcting step equalizes gray balance of the picked-up image by hardening a relatively soft gradation of the picked-up image.

26. The image processing method according to claim 5, wherein said correcting step equalizes gray balance of the picked-up image by softening a relatively hard gradation of the picked-up image.

27. The image processing apparatus according to claim 14, wherein said calculated luminance ratio represents a dynamic gradation range of the picked-up image, said predetermined reference luminance ratio represents a desired dynamic gradation range, and said means for correcting equalizes gray balance of the picked-up image by adjusting said dynamic gradation range of the picked-up image toward said desired dynamic gradation range.

28. The image processing apparatus according to claim 14, wherein said reference minimum value is corrected by dividing said reference maximum value by said predetermined reference luminance ratio, and said reference maximum value is corrected by multiplying said predetermined reference minimum value by said predetermined luminance ratio.

29. The image processing apparatus according to claim 14, wherein said means for correcting equalizes gray balance of the picked-up image by hardening a relatively soft gradation of the picked-up image.

30. The image processing apparatus according to claim 14, wherein said means for correcting equalizes gray balance of the picked-up image by softening a relatively hard gradation of the picked-up image.

* * * * *